United States Patent [19]

Ogano et al.

[11] Patent Number: 4,738,084
[45] Date of Patent: Apr. 19, 1988

[54] POWER GRASS MOWER

[75] Inventors: Takeo Ogano; Mikio Shoji; Toshihiro Toda, all of Saitama, Japan

[73] Assignee: Honda Giken Kogyo Kabushiki Kaisha, Tokyo, Japan

[21] Appl. No.: 776,034

[22] Filed: Sep. 13, 1985

[30] Foreign Application Priority Data

| Sep. 13, 1984 | [JP] | Japan | 59-193416 |
| Sep. 13, 1984 | [JP] | Japan | 59-193417 |
| Sep. 13, 1984 | [JP] | Japan | 59-193418 |
| Sep. 13, 1984 | [JP] | Japan | 59-193419 |
| Sep. 14, 1984 | [JP] | Japan | 59-193323 |

[51] Int. Cl.⁴ ............................................. A01D 69/00
[52] U.S. Cl. ................................. 56/11.2; 56/320.2; 56/DIG. 18; 16/111 A; 280/47.36
[58] Field of Search ............... 56/DIG. 18, 11.1–11.3, 56/15.4, 16.7, 13.6, 17.5, 320.1–320.2; 16/111 R, 111 A, 112; 280/47.37 R, 47.36

[56] References Cited

U.S. PATENT DOCUMENTS

| 2,740,485 | 4/1956 | Mohler | 56/11.2 X |
| 2,809,490 | 10/1957 | Oeters | 16/111 A |
| 2,926,478 | 3/1960 | Jepson | 56/13.6 X |
| 3,764,156 | 10/1973 | Nepper et al. | 56/DIG. 18 X |
| 4,020,619 | 5/1977 | Massaro | 56/11.2 |
| 4,048,788 | 9/1977 | Kamlukin et al. | 56/11.3 |
| 4,156,967 | 6/1979 | Ballas | 56/DIG. 18 X |
| 4,322,934 | 4/1982 | Doi | 56/11.2 X |
| 4,512,139 | 4/1985 | Musser et al. | 56/11.2 |
| 4,561,239 | 12/1985 | Cook | 56/320.1 |
| 4,601,163 | 7/1986 | Trelford | 56/16.7 |
| 4,603,478 | 8/1986 | Anderson | 16/111 R |

Primary Examiner—Kyle L. Howell
Assistant Examiner—Angela D. Sykes
Attorney, Agent, or Firm—Irving M. Weiner; Joseph P. Carrier; Pamela S. Burt

[57] ABSTRACT

A power grass mower (1; 100; 200) comprising a grass cutter (6) disposed under a mower body (2), a cutter housing (7; 107), a travelling mechanism (3, 4; 203, 204, 201) adapted to have the mower (1; 100; 200) travel, a power source (5) mounted on the mower body (2) to drive the cutter (6) and the travelling mechanism (3, 4; 203, 204, 201), and a handle member (14) connected to the mower body (2). The power grass mower (1; 100; 200) further comprises a handle position setting mechanism (39) for interconnecting a lower end part (14c) of the handle member (14) with the mower body (2), such that the handle member (14) is selectively turningly movable in the plan view thereof, relative to the mower body (2), substantially about the lower end part (14c) thereof, and for locking to set the handle member (14) at a voluntarily selected turning position thereof.

9 Claims, 10 Drawing Sheets

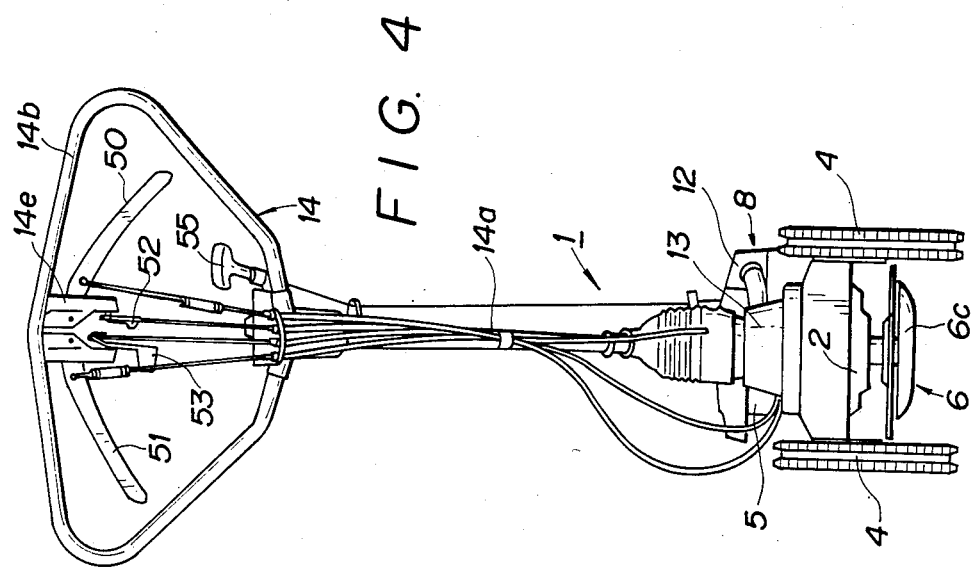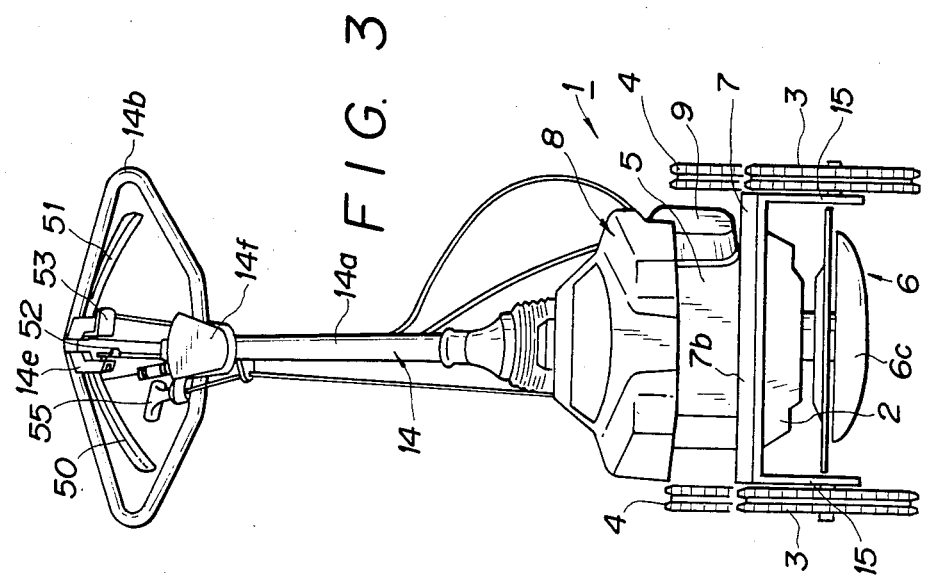

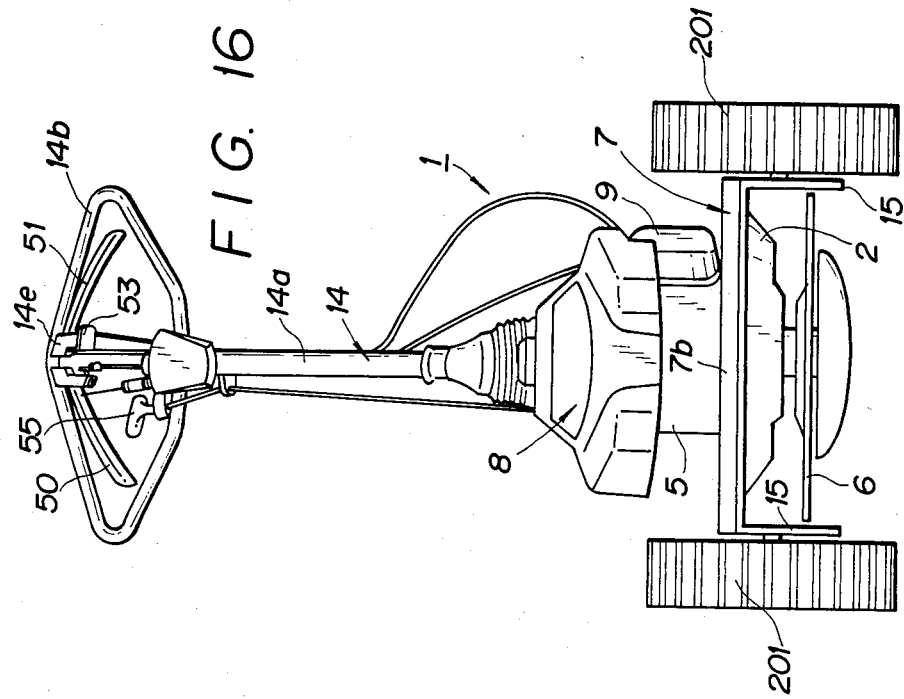
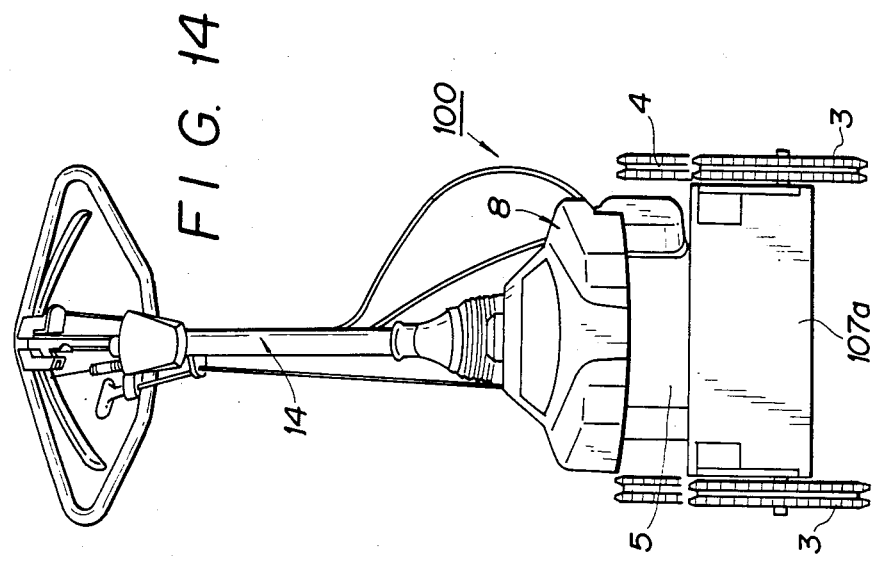

POWER GRASS MOWER

BACKGROUND OF THE INVENTION

1. Field of the Invention

The present invention generally relates to a power grass mower. More particularly, the invention relates to a power-operated grass-mowing machine as a small-sized working machine of the type which employs engine power to drive a cutter for cutting coarse grass.

2. Description of Relevant Art

For the cutting of coarse grass growing on the slope of a footpath or ridge between paddy fields or plowed fields, ordinary mobile type power lawn mowers or similar power grass mowers are difficult to use because the ground to be mowed is sloping. For that reason, there are currently used power grass mowers of a shoulder-carry, hand-hold operation type in which a round saw-like cutter is provided at the distal end of an arm.

The shoulder-carry hand-hold operation type of power grass mower normally includes a prime-mover as a cutter-driving power source provided with accessories thereof which the operator carries on his or her back, and an arm which is relatively long and provided with the cutter which the operator manipulates using his or her hands. This type mower has however some disadvantages such as that the weight is a heavy burden for the operator, that the reaction of cutter rotation is directly transmitted to the operator and hence the operation is all the more difficult, that due to the heavy weight the operator becomes tired during a long work and that the difficulty of controlling operation with the hands makes it difficult to mow grass at an even level relative to the sloping ground.

Such or similar problems of the shoulder-carry hand-hold operation type power grass mower are found also in other cases than when mowing grass on the slope of foot paths or ridges between fields; exemplarily, in the mowing of grass on the side of a bank, as well as when mowing grass on sloping flanks.

In this respect, by Japanese Patent Application Lay-Open Print No. 58-81708, laid open on May 17, 1983, there has been proposed a ground type of power grass mower with a purpose of permitting the mowing of grass on a slope to be easily done without requiring the operator to carry on his or her back an engine for driving a cutter.

According to this Japanese Patent Application Lay-Open Print, the ground type power grass mower included a thick plate-like ground foot member, a rotary cutter and an engine both mounted on the ground foot member, a handle shaft connected at one end thereof to the engine and formed at the other end thereof as a grip for the operator to handle, and a support wheel fitted on the handle shaft. The ground foot member was adapted to rotate with power from the engine. The support wheel was positionally adjustable in the axial direction of the handle shaft.

With such constitution, the ground type power grass mower relieved the operator from being burdened with weighty things such as the engine. Further, in respect of this type of power grass mower, due to possible rotation of the ground foot member which had a smooth bottom face, the power grass mower was said to have reduced the friction relative to the ground, thereby enabling the operator to remove the mower with ease.

However, this power grass mower, which was not of a self-propelled travelling type, had still left on the operator a burden attendant on the movement of mower, as it had been experienced, particularly at slopes.

Moerover, when working with this power grass mower, in which the handle shaft was fixed to the engine as a body of the mower, in places where the sloping angle of the ground was within a certain range, the operator had to take an unnatural posture to hold the mower, which made it difficult for the operator to perform mowing work for a long while.

Incidentally, the aforementioned ordinary self-propelled type power lawn mowers and similar power grass mowers are currently put to practical use as a small-sized working machine that employs engine power to move while driving a cutter for mowing lawn or grass.

A typical type of those self-propelled power mowers includes a cutter housing which has a cutter of a rotary blade type accommodated therein for cutting grass and a grass cut provided at one side thereof for guiding cut grass, at this side, laterally and rearwardly. The cut grass is so guided at the same side as to be simply discharged in the rearward direction or to be received in a grass bag attached to the outlet of the grass duct.

Such self-propelled type conventional power mowers, which are small-sized and handy, are generally adapted to move in the forward direction only and thus, when trying to move back and forth to cut grass along neighboring lines, the mower needed to be completely turned 180° at the forward end of each line.

Moreover, such conventional power mowers, though suitable for mowing work on flat places, are not adapted to cut grass in such places that are close to fence-like obstacles or at the inside of relatively narrow conduits or channels.

Further, in the use of such conventional power mowers, which have a cutter housing arranged at the bottom thereof and in which cut grass is guided to be discharged at either side of the cutter housing or received with a grass bag provided at the discharge side thereof, a further inconveniency is encountered when cutting grass such as weeds growing on the sides of footpaths or ridges between paddy or plowed fields or in ordinary agricultural fields or wasteland, such that the grass, generally grown tall at such places, may be forced down by, entirely giving way beneath, the cutter housing advancing to ride thereon and hence become difficult to cut neatly. In addition to that, the cut grass is not always needed to be discharged at the described one-side only; exemplarily, there being such a case to be observed at somewhere along a paddy field for example, that the cut grass had rather be thrown out in front or rear of the mower, to be left there as it withers, than being discharged into the paddy field; or in many cases, there being found such a tendency, at certain places or under certain conditions, that the cut grass is required to be dicharged at both sides of the mower, to be left there as it withers.

Incidentally, to overcome the necessity of turning the mower 180° after moving each line of grass in back-and-forth mowing work, there has been disclosed a power mower, in U.S. Pat. No. 2,926,478 by I. Jepson, patented on Mar. 1, 1960, in which a handle shaft is positionally variable relative to a mower body including an engine and a cutter.

In the power mower according to the United States Patent by Jepson, the handle shaft was adapted to be voluntarily selectively pivotable about the mower body, in a vertical plane including the longitudinal centerline of the mower body. Further, in this power mower, which was of a handcart type, the mower body was supported with four ground wheels permitting the mower to move in the longitudinal direction only. With such arrangement, it was permitted to make the back-and-forth mowing work by pivoting the handle shaft frontwardly at the forward end of each mowing line, without the need of turing the mower itself at an angle of 180°.

However, like the ordinary mobile type power mower, the handcart type power mower according to the Unites States Patent by Jepson was not yet sufficiently adapted for use in the mowing work on sloping ground.

Particularly, for an operator standing on a footpath between fields and trying to mow grass growing on the side slopes of the footpath, it was very difficult to continuously perform mowing work with the power mower by Jepson which was substantially unable to be wheeled in parallel with the footpath. Moreover, even when trying to do work, directly standing on the side slope of such footpaths, the operator had to bear an extremely large weight burden from this power mower because it is not of a self-propelled travelling type.

The present invention has been achieved to effectively solve such problems of and favorably accomplish associated desiderata of, conventional power grass mowers, without following the constitution of the shoulder-carry, hand-hold operation type power grass mower which is inconvenient to operate.

SUMMARY OF THE INVENTION

According to the present invention, there is provided a power grass mower (1; 100; 200) comprising a mower body (2), a grass cutter (6) disposed under the mower body (2), a cutter housing (7; 107) attached to the mower body (2) to cover the grass cutter (6), a travelling means (3, 4; 203, 204, 201) provided for the mower body (2) and adapted to have the mower (1; 100; 200) travel, a power source (5) mounted on the mower body (2) and operatively interconnected with the grass cutter (6) and the travelling means (3, 4; 203, 204, 201) to drive both (6, 3, 4; 6, 203, 204, 201), a handle member (14) constituted at an upper part (14b) thereof as a grip for an operator to handle and connected at a lower end part (14c) thereof to the mower body (2), and a handle position setting mechanism (39) for interconnecting the lower end part (14c) of the handle member (14) with the mower body (2), such that the handle member (14) is selectively turningly movable in the plan view thereof, relative to the mower body (2), substantially about the lower end part (14c) thereof, and for locking to set the handle member (14) at a voluntarily turning position thereof.

Accordingly, an object of the present invention is to provide a power grass mower of a self-propelled travelling type which permits the operator, even at any slope that may be encountered, such as a conduit-like or channel-like ground form in an extreme case, to perform with ease the mowing of grass on such place, without be burdened with supporting the mower's weight.

The above and further features, objects and advantages of the present invention will more fully appear from the following detailed description of the preferred embodiment of the invention when the same is read in conjunction with the accompanying drawings.

BRIEF DESCRIPTION OF THE DRAWINGS

In the drawings:

FIG. 3 is a front view of the mower of FIG. 1;

FIG. 4 is a rear view of the mower of FIG. 1;

FIG. 14 is a front view of the mower of FIG. 13;

FIG. 16 is a front view of the mower of FIG. 15.

DETAILED DESCRIPTION OF THE PREFERRED EMBODIMENT

Figure 1:
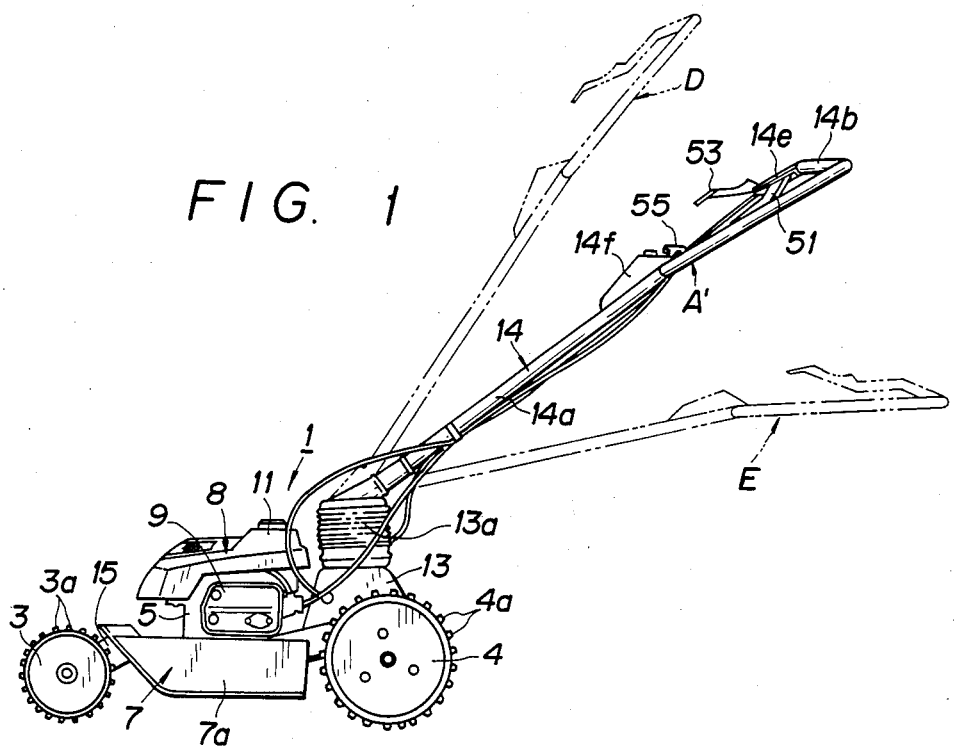
FIG. 1 is a left side view of a power grass mower according to a preferred embodiment of the invention.

With reference to FIGS. 1 to 6, designated at reference numeral 1 is the entirety of a power grass mower according to a preferred embodiment of the present invention.

The constitution of the mower 1 will now be wholly described.

The power grass mower 1 includes a mower body 2 provided with a pair of rolling front wheels 3, 3 at the left and right of the front part thereof and a pair of driving rear wheels 4, 4 at the left and right of the rear part thereof. The rolling front wheels 3, 3 and the driving rear wheels 4, 4 having formed thereon many radial projections 3a, 4a equi-angularly spaced apart to be distributed over the entire outer circumferences thereof, respectively, thus being configured into a toothed-gear-like form in the side view thereof to thereby increase the holding forces relative to the ground. At the longitudinally central part of the mower body 2, on the transversely central part thereof is mounted an engine 5 of a vertical type having a crankshaft (not shown) thereof vertically arranged in this embodiment, the engine 5 being adapted to drive a grass cutter 6 disposed under the mower body 2, at a position directly below the engine 5.

Figure 6:
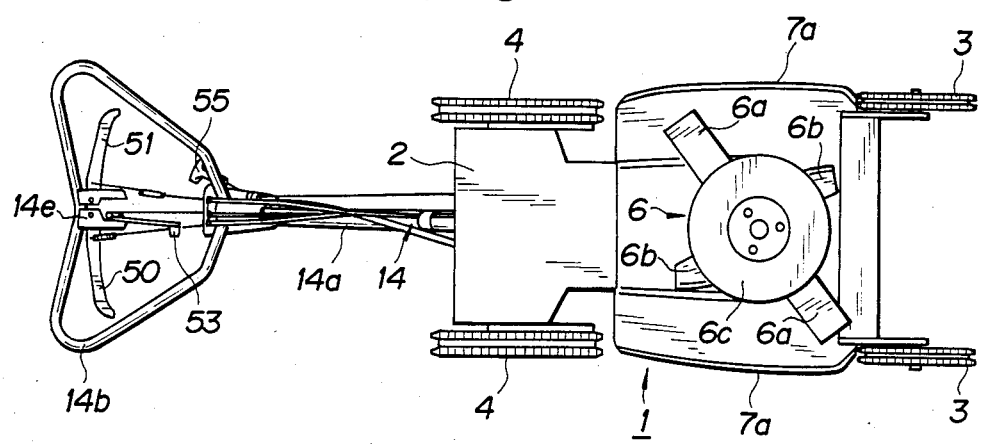
FIG. 6 is a bottom view of the mower of FIG. 1.

As most clealy shown in FIG. 6, which is a bottom view of the mower 1, the grass cutter 6 comprises a combination of a pair of relatively long blade members 6a and a pair of relatively short blade members 6b, the long and short blade members 6a, 6b being arranged symmetrically with respect to the axis of the crankshaft, respectively, and a protector 6c for preventing grass from entering and becoming entwined in a central inner space where the blade members 6a, 6b are connected. The blade members 6a, 6b are sharp along the edges thereof, so that grass on the ground is cut to be mowed by rotation of the grass cutter 6. The protector 6c serves also for pushing forth such grass therebeneath, that is taller than a predetermined level, toward the blade members 6a, 6b. Incidentally, in FIGS. 3 and 4, the configuration of the cutter 6 is schematically shown.

The mower body 2 has along both side edges thereof a pair of downwardly extending side plates 7a, 7a which are interconnected along the top edges thereof with each other through a top plate 7b, to thereby constitute a cutter housing 7 covering the grass cutter 6, so that the cutter 6 is covered from outside at both sides thereof with the housing 7, while it is left opened at both the front and rear thereof, that is, in the longitudinal direction of the mower 1.

The engine 5 is covered from above with an engine cover 8; there being disposed a muffler 9 and a carburetor 10 as a fuel feeding device at left and the right sides of the engine 8, respectively. Also provided are a fuel tank 11 in the rear of the upper part of the cover 8 and an air cleaner 12, at the same side as the carburetor 10, in the rear of the upper part of the cover 8.

Figure 2:
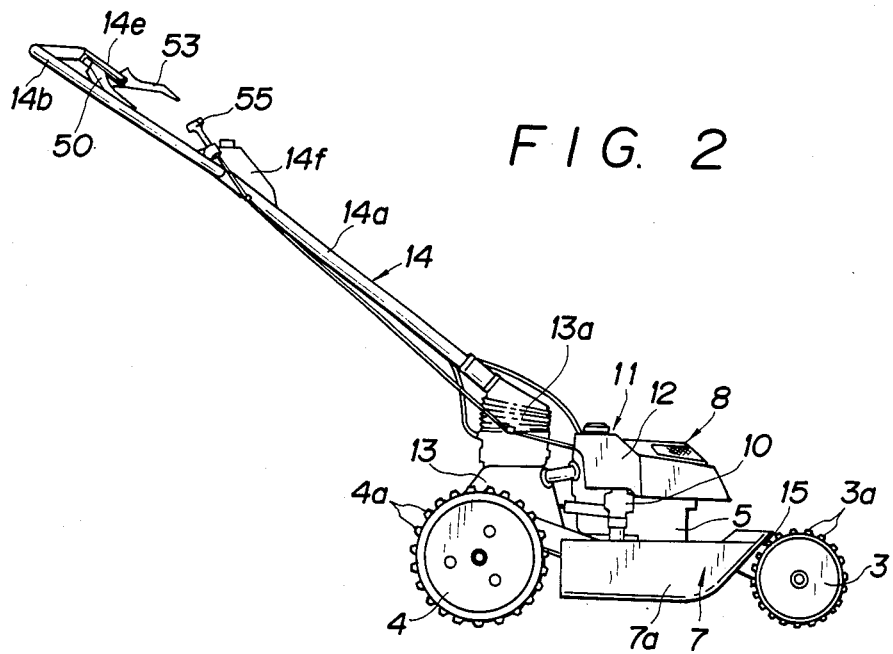
FIG. 2 is a right side view of the mower of FIG. 1.

In the rear part of the mower body 2, between the left and right driving rear wheels 4, 4, there is upwardly standing a handle post 13, from above of which is upwardly extending a rearwardly slanting handle member 14 as shown in FIGS. 1 and 2, which member 14 is covered at the lower end thereof with a bellows cover 13a. The handle member 14 comprises a pipe-like shaft portion 14a extending from above the handle post 13 and a loop-like handle portion 14b formed, as a grip for an operator to handle, at the upper end of the shaft portion 14a. On the other hand, the front part of the mower body 2 has fixed thereto, at the right and the left side thereof, a pair of frontwardly descending brackets 15 rollably supporting the front wheels 3, 3, respectively.

Figure 7:
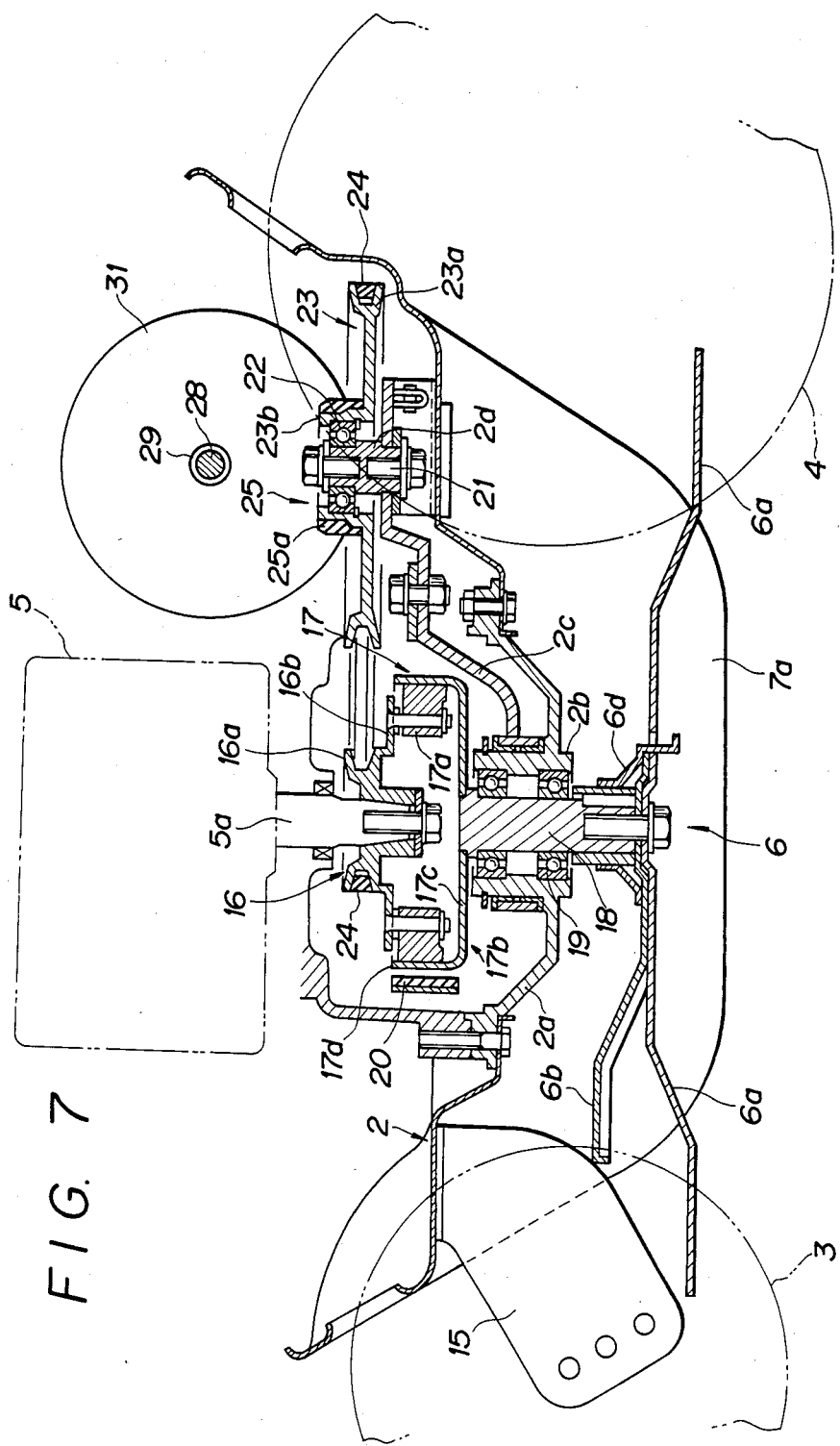
FIG. 7 is an enlarged longitudinal sectional left-side view of an essential part including a driving system of the mower of FIG. 1.
Figure 8:
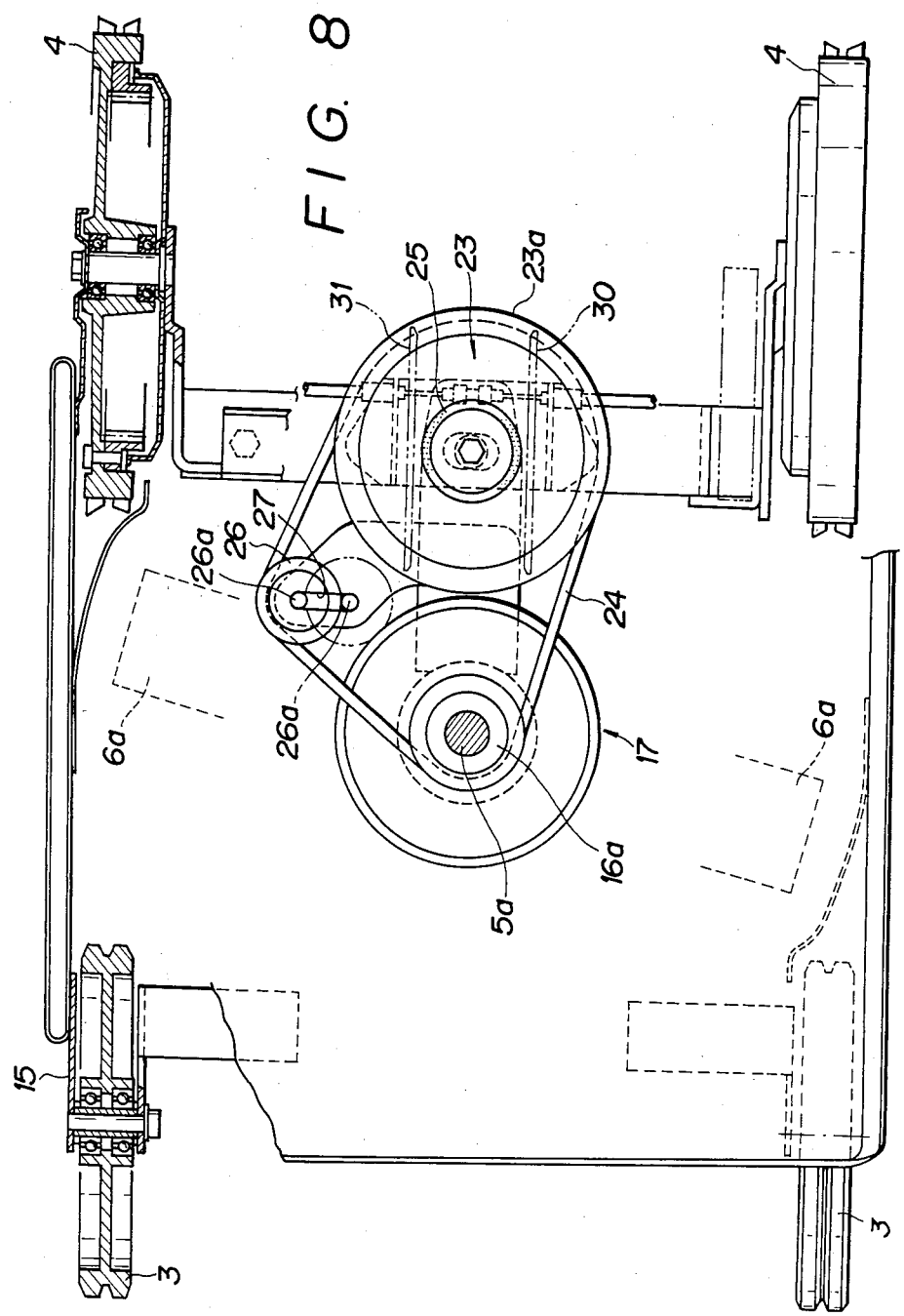
FIG. 8 is a plan view of the driving system of FIG. 7.
Figure 9:
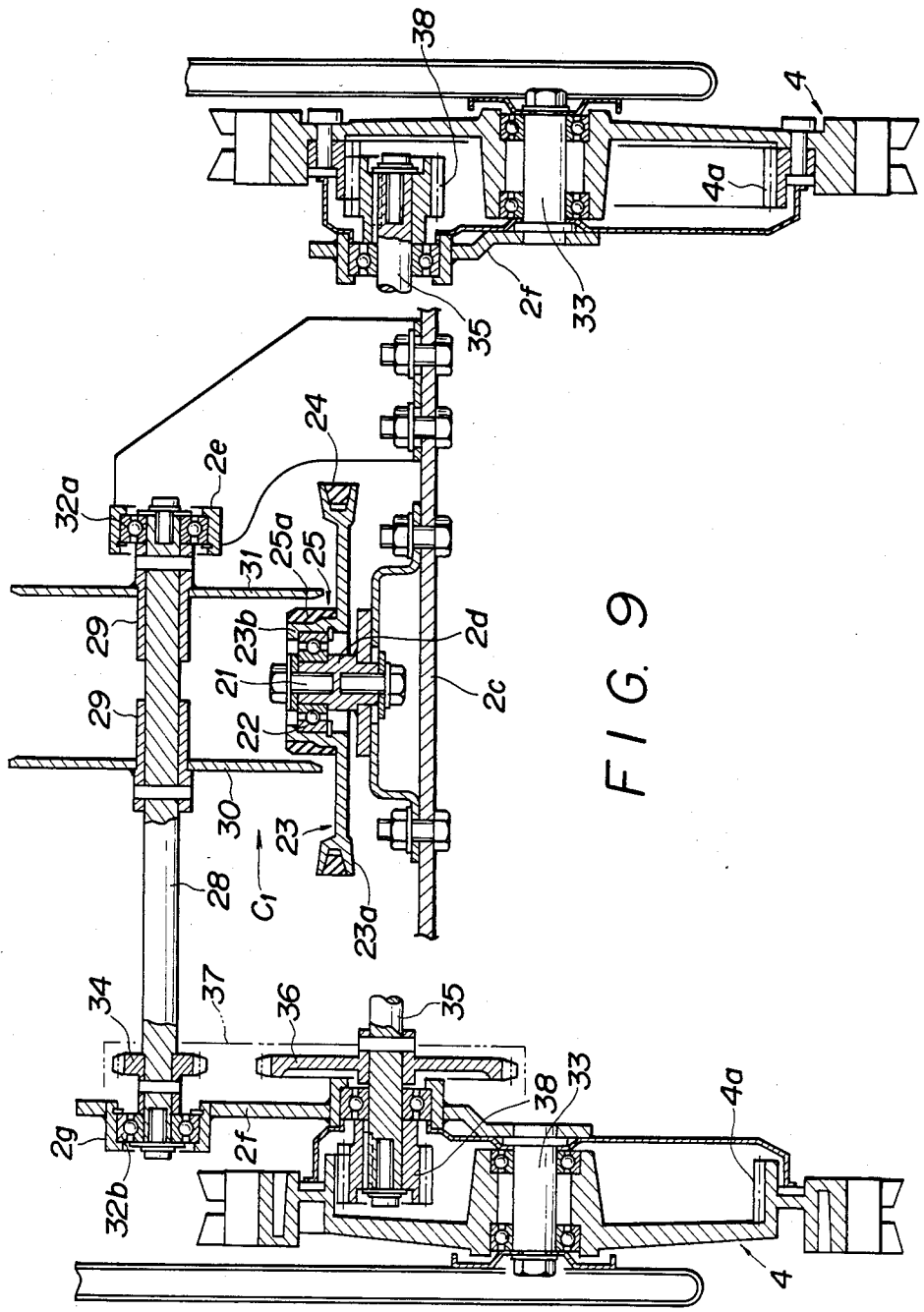
FIG. 9 is an enlarged sectional front view of a rear wheel driving system portion of the mower of FIG. 1.

The power grass mower 1 includes a driving system as shown in FIGS. 7 to 9, which system is supplied with engine power through an output shaft 5a downwardly projected from the engine 5, as shown in FIG. 7. The output shaft 5a has fixed thereon a driving pulley member 16 formed in the upper part thereof as a small-diameter pulley 16a and in the lower part thereof as a disc-like flange 16b. The flange 16b has coaxially arranged on the lower surface thereof a plurality of engagement segments 17a equi-angularly spaced to be symmetrical with respect to the axis the pulley 16. The segments 17a are adapted (to function as a clutch inner member as a whole) to be centrifugally spread, while cooperating, to constitute a centrifugal clutch 17, with an upwardly opened drum-like clutch outer member 17b disposed under the flange 16b and formed in a circular shape with a larger diameter than the flange 16b. The clutch outer member 17b has fixed thereto, at the central part of a bottom plate portion 17c thereof, the upper end of a vertical cutter axle 18 which is provided through a boss portion 2b of a holder 2a extended from the mower body 2, while the axle 18 is rotatably supported therein by means of a bearing 19. To the lower end of the cutter axle 18, the grass cutter 6 is fixed by using a cutter holder 6d, the grass cutter 6 being constituted as a combination of the long and short blades 6a, 6b and the cutter cover 6c.

In the foregoing arrangement, when the number of revolutions per minute of the output shaft 5a is increased to a predetermined speed, the engagement segments 17a are caused to spread to be brought into engagement with the inner circumference of a peripheral plate 17d of the clutch outer member 17b, thereby transmitting driving forces through the cutter axle 18 to the grass cutter 6, which is thus driven to rotate. Incidentally, the clutch 17 has arranged therefor, at the outside of the peripheral plate 17d of the clutch outer member 17c, a brake shoe 20 as a braking device adapted to be brought into abutment with the peripheral plate 17d, when a later-described lever 51 is operated, to effect the braking of the grass cutter 6.

The afore-mentioned holder 2a has fixed on the boss portion 2b thereof the front end of a support frame 2c rearwardly extending therefrom in an upwardly twice-stepping manner to fix to the rear end thereof, by means of a bolt 21, a boss member 2d as a support shaft standing upright. The boss member 2d has fitted on the upper part thereof a driven pulley member 23, with a bearing 22 put therebetween, which pulley member 23 is formed, at the lower part thereof, as a driven pulley 23a of a relatively large diameter driven from the drive pulley 16 through a drive belt 24 stretched therebetween and, at the upper part thereof, as a cylindrical portion 23b of a relatively small diameter cooperating with an annular friction member 25a fitted to be stuck thereon to constitute together a friction drive roller 25. The drive and driven pulleys 16a, 23a are spaced from each other in the longitudinal direction of the mower 1 and, as shown in FIG. 8, have disposed therebetween, at the inside of the drive belt 24, a tension pulley 26 arranged on the mower body 2, at the same level as the drive and driven pulleys 16a, 23a, such that, with a vertical pulley shaft 26a thereof slidably engaged in a transversely elongate hole 27 formed in the mower body 2, the tension pulley 26 is adapted to be transversely movable, by operation of a laterdescribed lever 50, to be pushed against the inside of the drive belt 24 or detached therefrom, to thereby tighten or slacken the belt 24, effecting connection or disconnection of power transmission between the drive and driven pulleys 16a, 23a, respectively.

As shown in FIG. 9, above the driven pulley member 23 is disposed a transversely extending middle transmission shaft 28, which has fitted thereon left and right circular plate-like friction driven discs 30, 31 adapted, through a pair of slide collars 29, 29, to be axially slidable along and non-rotatable relative to, while integrally rotatable with, the transmission shaft 28. Under the shaft 28, between the friction driven discs 30, 31 is standing the friction drive roller 25 cooperating therewith to constitute a friction clutch C1. The left and right friction discs 30, 31 as shown in FIG. 9 are each respectively put in a neutral position thereof where it is engaged from the friction roller 25 put therebetween. The friction discs 30, 31 are adapted to be either brought, by operation of a later-described forward-reverse select lever 52, into frictional engagement with the friction member 25a of the friction roller 25, of which the driving forces are then transmitted thereto, driving the transmission shaft 28 into rotation in the forward or reverse direction thereof, depending on the selection of the disc 30 or 31 to be engaged with the roller 25, whereby the driving rear wheels 4, 4 are driven to roll in the forward or reverse direction to thereby propell the mower 1 forwardly or rearwardly.

The aforesaid middle transmission shaft 28 is supported at one end (the right end in this embodiment) thereof by means of a bearing 32a fixed in a boss portion 2e formed in a rigid part of the mower body 2 and likewise at the other end (the left end) thereof by means of a bearing 32b fixed in a boss portion 2g formed in a supporting part 2f that the mower body 2 has provided for rotatably supporting the rear wheel 4 at this side (the left side). The rear wheel 4 at the opposite side (the right side) also is rotatably supported by another supporting part 2f that the mower body 2 has at this side (the right side). More specifically, the left and right driving rear wheels 4, 4 are rotatably supported through left and right axles 33, 33 by the rear wheel supporting parts 2f, 2f of the mower body 2, respectively, while a final transmission shaft 35 is transversely arranged to be put between, so as to be inserted at both ends thereof through, the left and right supporting parts 2f, 2f. The middle transmission shaft 28 has fixed thereon, near the aforementioned other end (the left end) thereof, a drive sprocket 34 of a relatively small diameter, on one hand, and the final transmission shaft 35 has fixed thereon, at the corresponding side (the left side) thereof, at the transversely inner side of the supporting part 2f, a driven sprocket 36 of a relatively large diameter, on the other hand, which driven sprocket 36 is interconnected through a drive chain 37 with the drive sprocket 34. Moreover, the final transmission shaft 35 has fixed, on both end parts thereof transversely outwardly projected through the left and right supporting parts 2f, 2f of the mower body 2, a pair of pinions 38, 38, on one hand, and, on the other hand, the rear wheels 4, 4 have formed in the inside diameter portions thereof a pair of ring gears 4a, 4a meshing with the pinions 38, 38, to thereby constitute left and right internal gear drives, respectively.

In the foregoing arrangement, the driving forces as transmitted from the drive pulley 16a through the drive belt 24 to the driven pulley 23a are further transmitted from the friction drive roller 25, selectively through the friction driven disc 30 or 31, to the middle transmission shaft 28, rotating the shaft 28 in the forward or reverse direction, and then still further therefrom through the drive sprocket 34, the drive chain 37, the driven sprocket 36, the final transmission shaft 35, the pinion 38, and the ring gears 4a to the left and right rear wheels 4, 4, while driving the rear wheels 4, 4 into rolling motions. As will be easily understood, the respective parts designated by reference numerals 16, 24,23, 25, 30, 31, 28, 34, 37, 36, 35, and 38 are cooperating together to constitute a transmission system for transmitting power of the engine 5 to the rear wheels 4, 4.

Description will now be made of possible movements of the handle member 14 as well as of the constitution and function of associated mechanism.

Figure 5:
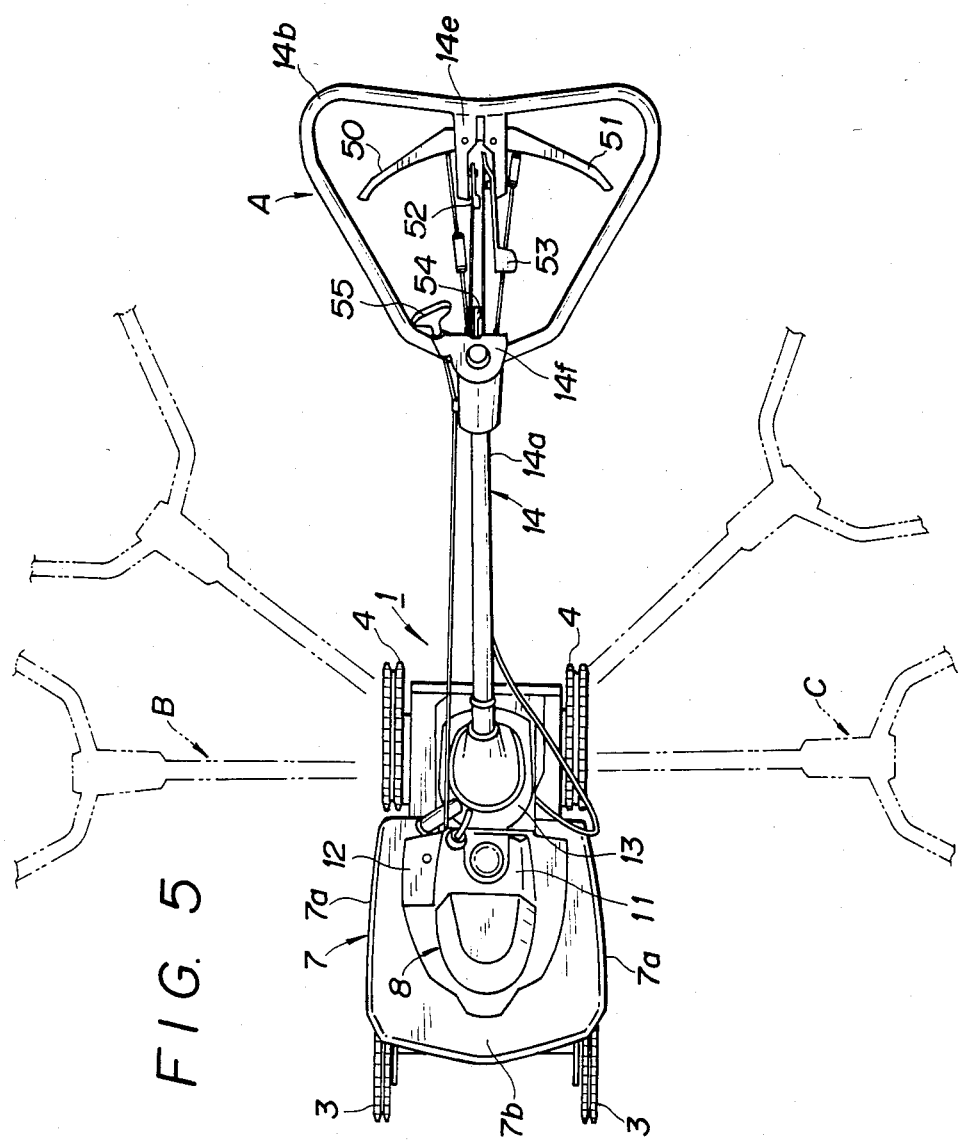
FIG. 5 is a plan view of the mower of FIG. 1.

The handle member 14 is adapted to be pivotingly movable relative to the handle post 13, such that, as shown in FIG. 5, in the plan view, it is turnable from a normal center position A thereof to the left and the right, exemplarily at 90° where it takes a left-90° position B thereof and a right-90° position C thereof, respectively. Further, the handle is selectively lockable at leftward or rightward angular positions thereof between and including the left-90° and the right-90° positions B, C and besides, as shown in FIG. 1, also in the side view, it is adjustably turnable, at the voluntary leftward or rightward angular position, from a normal grip-level position A' thereof upwardly, exemplarily at an angle of a high level position D thereof in the Figure and further to a substantially upright position thereof (not shown), and downwardly, exemplarily at an angle of a low level position E thereof in the Figure, and lockable to be set at an arbitrary upward or downward angualr position thereof between the upright position and the low level position E.

Such angular movement and position locking of the handle member 14 is permitted by the presence of a position setting mechanism 39, of which description will be made below with reference to FIGS. 10 and 11, that is, a sectional side view and a plan view of an essential part of the position setting mechanism 39, respectively.

In the aforementioned bellows cover 13a of the handle post 13 is provided an upright standing base pipe 60, to the upper end of which is fixed the base part of a substantially horizontally extending base plate 61 of a semi-circular form in the plan view. The fixed base plate 61 is formed with a toothed portion 62 along the entire circular circumference thereof, whereas such a toothed portion may be formed only within a predetermined circumference angle of the base plate 61. In the upper end part of the base pipe 60 is rotatably fitted the lower part of a tubular support member 63, of which the upper part is projected over the base plate 61 up to a predetermined level relative thereto. For pivotally supporting the shaft portion 14a of the handle member 14, which portion 14a has fixed on a lower end part 14c thereof a plate-like bracket member 64 foldedly bent to form a downwardly projecting bifurcate portion 65 thereof, the tubular support member 63 has provided therethrough, at the upper end part thereof, a horizontal pivot shaft 66 on which the bifurcate portion 65 of the bracket member 64 is fixed to be pivotable thereabout. The entire handle member 14 including the pipe-like shaft portion 14a is thus adapted to be turningly movable, about the pivot shaft 66, clockwise and counterclockwise in FIG. 10, while it is further adapted, by the the support member 63 rotatably fitted in the base pipe 10, so as to be turningly movable about the pipe 10 clockwise and counterclockwise in FIG. 11 as well as in FIG. 5.

The bifurcate portion 65 of the bracket member 64 has at either side thereof a fan-like restriction member 67 welded thereto to be integrally joined therewith, which member 67 also is fixed at the base part or fan-pivot part thereof on the horizontal pivot shaft 66 so as to be rotatable thereabout. The restriction member 67 is configured into a sector gear form having a toothed portion 68 along the arcuate edge thereof.

Between bifurcated ends of the bifurcate portion 65 of the bracket member 64, the support member 63 is fixed thereon a base part 70 of a holder member 69 shaped substantially in the L-form in the side view, which base part 70 is upwardly spaced apart from the fixed base plate 61, with a collar 71 put therebetween, the collar 71 being fitted on the support member 63. The base part 70 is extended in parallel with the base plate 61, constituting a horizontally extending portion 72 of the holder member 69, which portion 72 is upwardly bent at the rear end thereof to provide, as an integral part thereof, a vertically extending portion 73 of the member 69. On the horizontally extending portion 72 of the holder member 69 is upright standing a pin member 74, which has a lower end part 74a thereof engaged in, to be slidable along, a longitudinally elongate hole 75 formed in the horizontally extending portion 72. More specifically, the pin member 74 comprises, besides the lower end part 74a, a base portion 76 of a relatively large diameter projecting over the horizontally extending portion 72 of the holder member 69, and a pin portion 77 of a relatively small diameter further upwardly projecting over the base portion 76, which pin portion 77 has pivoted on the vertically intermediate part thereof a base part 79 of a sliding pin 78 extending in the longitudinal direction of the mower 1. The sliding pin 78 is fitted at a longitudinally middle part 80 thereof in a guide hole 81 which is formed, with a somewhat larger diameter than the pin 78, in the vertically extending portion 73 of the holder member 69, and hence a distal part 82 of the pin 78 is outwardly projected from the vertically extending portion 73, that is, toward the rear of the mower 1.

The pin portion 77 of the pin member 74 has further pivoted thereon respective base parts 84 of upper and lower horizontally extending cam plate members 83, 83 disposed above and below the sliding pin 78, respectively. Each of the cam plate members 83, 83 is shaped, as shown in FIG. 11, subtantially in the form of a triangle in the plan view, while employing one corner part thereof as the pivoted base part 84 and another corner part thereof nearer to the part 84 than the rest as a cam part 85 brought into abutment with a stopper plate 86 provided on the front side of the vertically extending portion 73 of the holder member 69, around the guide hole 81 formed in the portion 73. The cam plate member 83 is extended to have a distal part 87 thereof located opposite the base part 84, that is, at the remaining corner part of the aforesaid triangle, to which part 87 is connected a distal end 91a of an inner member 91 of an operation cable 90. The outer member 89 of cable 90 is fixed at a distal part 89a thereof to a cable support part 88 that is formed on, as an extension on the rearwardly facing side of, the vertically extending portion 73 of the holder member 69, while the inner member 91 of the cable 90 is operatively connected to a later-described operation lever 53.

Figure 11:
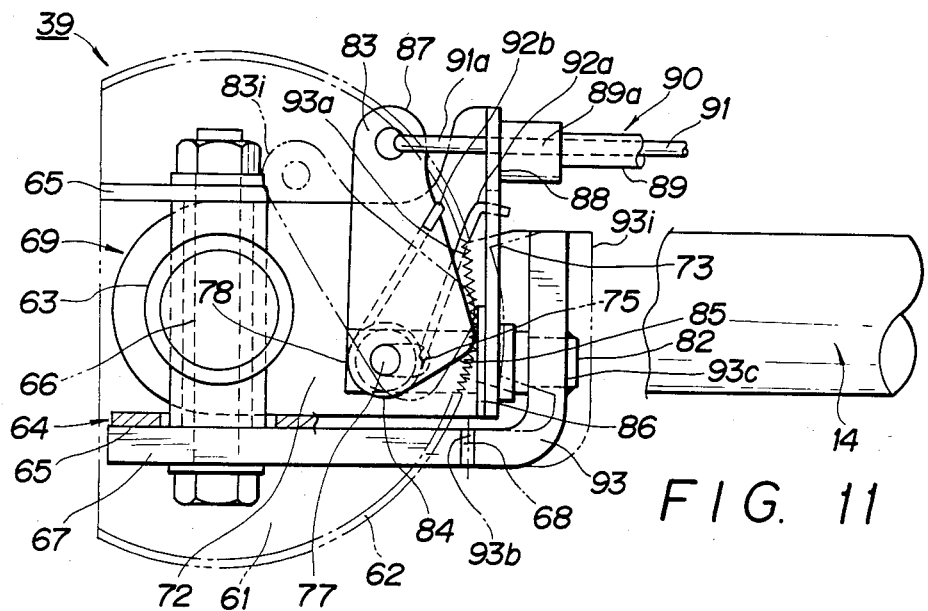
FIG. 11 is a plan view of the handle position setting mechanism of FIG. 10.

On the other hand, on the large-diameter base portion 76 of the pin member 74, there is wound a spring 92 engaged to be hooked, at one end part 92a thereof, on the boundary part between the horizontally extending portion 72 and the vertically extending portion 73 of the holder member 69 and, at the other end part 92b thereof, on the rear edges of the cam plate member 83, 83, thereby normally urging the cam plate members 83, 83 into counterclockwise rotation thereof in FIG. 11, which direction corresponds to a disengagement direction of a below-described engagement member 93.

The engagement member 93, which is substantially of an L-form in the side view as well as in the plan view, is arranged so as to extend along the rear side, a lateral side, and the lower surface of the vertically extending portion 73 of the holder member 69. More particularly, the member 93 has, in the lower end part thereof, a lower toothed portion 93a of a predetermined width opposed to the outer circumference of the semi-circular base plate 61 and adapted to be engaged with the toothed portion 62 formed thereon and, in the upper part thereof, a vertically extending upper toothed portion 93b opposed to the outer circumference of the fan-like restriction member 67 and adapted to be engaged with the toothed portion 68 formed thereon. An intermediate part 93c of the member 93 is welded to the distal part 82 of the sliding pin 78. With such constitution, the engagement member 93 is adapted to be longitudinally movable, while being guided to secure such movement with a guide rod 94 connected at the dital part thereof to the upper part of the engagement member 93 and slidably fitted in a guide cylinder 95 projectingly formed on the upper part of the tubular support member 63.

Figure 10:
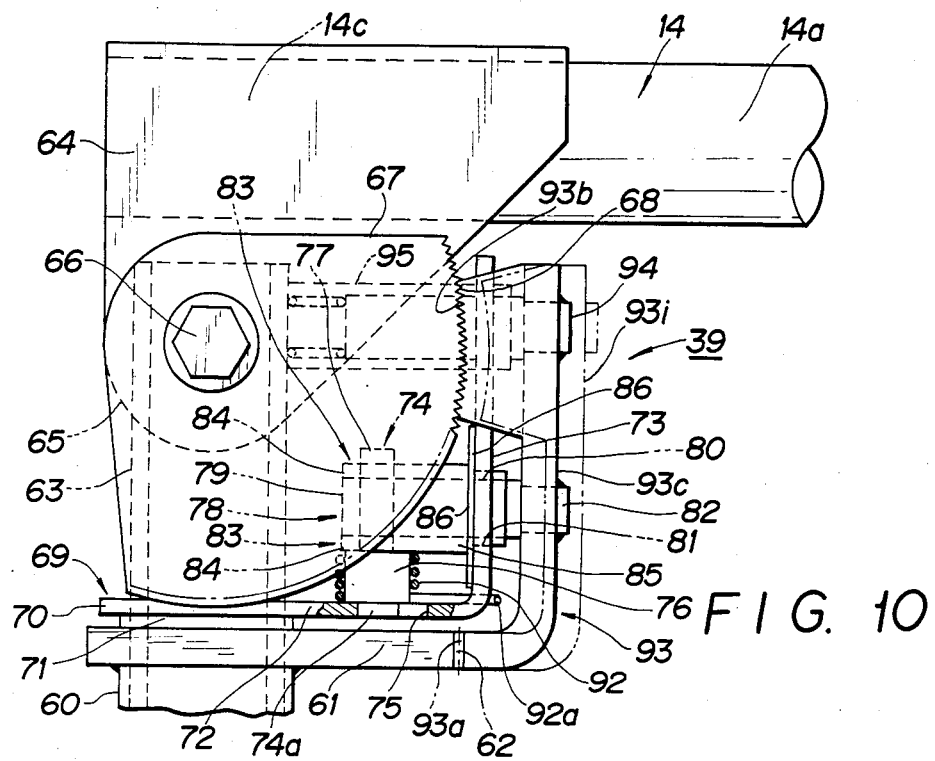
FIG. 10 is an enlarged side view of a handle position setting mechanism of the mower of FIG. 1.

In the foregoing arrangement, in a state shown by solid line in FIGS. 10 and 11, the distal part 87 of the cam plate member 83 is pulled to the right in FIG. 11 with the cable inner member 91, thus putting the engagement member 93 in a position thereof shown by solid line in FIG. 11, and hence the pin member 74 is placed at the left end of the elongate hole 75 formed in the horizontally extending portion 72 of the holder member 69, so that the engagement member 93 is pushed with the sliding pin 78 to the left in FIG. 11. Accordingly, the engagement member 93 is forced to approach the fixed plate 61 and the restriction member 67, bringing the lower and upper toothed portions 93a, 93b thereof into engagement with the toothed portions 62, 68 of the latter members 61, 67, so that the handle shaft portion 14a as well as the handle member 14 itself is restricted against up-down and lateral turning movements thereof and thus fixed in a position.

When it is desired to change the position of the handle member 14 relative to the mower body 2, then the lever 53 shown in FIGS. 1 to 3 is to be let down frontwardly, thereby slackening the cable inner member 91, causing the cam plate member 83 to rotate counterclockwise in FIG. 11 by the effect of resilient forces of the spring 92, so that the cam part 85 of the cam plate member 83 pivotingly moves, while keeping abutment thereof with the stopper plate 86, upwardly in FIG. 11, as shown by broken line 83i in FIG. 11, that is, in the direction far away from the observer of FIG. 10. As a result, the pin member 74 is guided along the elongate hole 75 of the holder member 69 to the right in FIGS. 10 and 11, whereby the sliding pin 78 supported by the pin member 74 if forced along the guide hole 81 to the right in the Figures, thus bringing also the engagement member 93, which is fixed to the distal part of the sliding pin 78, into rightward movement, while this movement is assured with the guide rod 94. Accordingly, the lower and upper toothed portions 93a, 93b of the engagement member 93 are disengaged from the toothed portion 62 of the base plate 61 and the toothed portion 68 of the restriction member 67, respectively, as illustrated by broken line 93i in the Figure. As a result, the handle member 14 is permitted to rotatably move upwardly and downwardly about the horizontal pivot shaft 66, as well as to the left and right in FIGS. 5 and 11 about the upright standing base pipe 60, which has rotatably fitted therein the support member 63 on which the bracket member 64 of the handle member 14 is fixed.

As will be understood from the foregoing description, according to this embodiment, with a single releasing operation, the respective engagements restricting up-down and lateral movements of the handle member 14 are unlocked, thus permitting up and down movements and lateral movements thereof to be selectively made both independently and in a combination manner, to thereby establish any desired position. Moreover, with a simple operation of returning the lever 53 to its initial position, the cam plate member 83 is returned to an original position thereof, pulling back the engagement member 93 to the left in FIGS. 10, 11, thus bringing the toothed portions 93a, 93b into engagement with the toothed portions 62, 68, respectively, so that the handle member 14 is locked to be set at the established position thereof.

As shown in FIGS. 1 to 6, the loop-like (looped in this embodiment) handle portion 14b of the handle member 14 has arranged within the central upper part thereof a bracket 14e provided: at one side thereof, with the lever 50 for propelling-power control operation, the lever 50 being adapted for connection and disconnection of the transmission of engine power to the driving rear wheels 4, 4, that is, a tightening-slackening operation lever for the tension roller 26; at the other side thereof, with the lever 51 for braking operation, that is, for operation of the brake shoe 20 for braking the grass cutter 6; in front thereof, with the forward-reverse select lever 52 for the selection between the friction discs 30, 31; and in parallel therewith, with the operation lever 53 for unlocking the engagement of the position setting mechanism 39 for the handle member 14. The handle portion 14b is formed on the upper end of the handle shaft portion 14a and supported at the base part thereof by a boss portion 14f, which is provided: in the central part thereof, with a throttle control lever 54; and in the vicinity thereof, with a recoil starter operation knob 55.

With the respective operation levers 50 to 55 disposed in the handle portion 14b, the mower 1 is adapted to permit the operator to perform on-off operations of travelling power transmission, forward-reverse selection, throttling control, the braking of the cutter 6, lateral and vertical turning-position adjustment and setting of the handle member 14, and start-stop operation of the engine 5.

Exemplarily, mowing work using the mower 1 is initiated by the steps of starting the engine 5, and operating the throttle lever 54, raising the number of revolutions per minute of the engine 5 above a predetermined speed, thereby putting the centrifugal clutch 17 in service to start rotation of the cross-blade type cutter 6. Voluntarily, the forward-reverse select lever 52 is operated to forwardly travel, while cutting grass along mowing lines.

When mowing, because the cutter housing 7 is opened both frontwardly and rearwardly, in the travelling direction of the mower 1, grass to be cut is kept standing, without being bent down, giving way as it otherwise would be forced by the housing on conventional grass mowers. Even when some portion of the housing 7 that is at a higher level than the opening thereof is interfering with the top of tall grass in the travelling direction, the bending of grass is kept within such an extent that the head is simply flexed to give way, while leaving the stem, as it stands opposing the cutter 6, so that the grass is cut evenly without fail by rotation of the cutter 6, to be discharged in a rearward direction with respect to the travelling direction. In this respect, in use of the mower 1, which is not provided with grass bag, cut grass is discharged rearwardly of the travelling direction, to be left along the travelling path, as it withers with elapse of time.

After having cut coarse grass along a certain distance of a mowing line by letting the mower 1 advance, when the operator tries to cut the grass of the next mowing line, there are taken steps of moving aside the mower 1, as it is in given position, a distance corresponding to the mowing width, and changing the forward-reverse select lever 52, thereby letting the mower 1 travel backwards, while cutting grass; cut grass being discharged rearwardly of the travelling direction, that is, in front of the mower 1 itself, to be left there, as it withers with time. By repetition of such operations, paralleled mowing lines are mowed one by one, without the need of turning the mower 1 itself 180°, so that the mowing work is efficient. Under certain conditions, such mowing work may be performed, with the handle member 14 kept in a rearwardly extending position thereof such as the position E of FIG. 1.

Incidentally, in rearwardly travelling mowing work, it otherwise might so happen in close vicinity to a fence that an operator back into or touch the fence with no space left therebetween, and is prevented from continuing mowing by rearward travel, thus leaving grass, as it is not cut, near the fence. With the mower 1, however, such case is easily overcome by employing steps of operating the engagement unlocking lever 53 to thereby release the engagement member 93 of the position setting mechanism 39 from the restriction members 61, 67, pivotally turning the handle member 14 to the left or right till it acquires a best position substantially parallel with the fence, and locking the handle member 14 to set at the best position. Then, the mower 1 is favorably permitted to travel and further approach the fence, by operations of the handle member 14 which has been adjusted perpendicularly to the travelling direction, that is, it is to move like the sidewise crawl of a crab, while cutting all the grass in an area near the fence, and without leaving grass non-mowed. The pivotal turning position of the handle member 14 in the plan view is voluntarily selectable, ranging from a normal central position to a left-90° position and to a right-90° position, that is, within the ranges of A to B and A to C of FIG. 5, which means it also is possible to have the mower 1 obliquely travel with respect to the handle member 14 by adequately setting the angular position of the handle member 14 relative to the mower body 2, thus permitting as easy form of travelling operation different from the method resembling the sidewise crawl of a crab.

As will be understood from the foregoing description, according to this embodiment, in use of the mower 1 which is provided with the handle member 14 capable of selective angular positioning as described, the operator is advantageously permitted to employ the steps of, after having cut grass along a certain distance of a mowing line by letting the mower 1 advance, having the mower body 2 face the next mowing line, setting the handle member 14 at an angular position thereof such as by a half-turn so as to facilitate involved mowing operations, operating the forward-reverse select lever 52 to let the mower 1 advance or retreat, as necessary for the work at the facing mowing line, and entering the mowing work, while holding the handle member 14 at the set position easy to operate. Thus, by combination of the possible pivotal turning of the handle member 14 and the selectable forward and reverse travel, the mowing of grass is permitted to be efficiently performed, without the need of turning the direction of mower itself from time to time.

Moreover, by the function of the position setting mechanism 39, the handle member 14 is permitted to be angularly adjusted, ranging from the position A' (of a normal grip-level) upwardly to the position D (of a higher grip-level) or further up to a substantially upright position and downwardly to the position E (of a lower grip-level), in FIG. 1. In other words, the position setting mechanism 39 permits the handle member 14 to be selectively turningly movable through relatively large angular ranges in both the plan view thereof and the side view thereof, and also permits the handle member 14 to be locked into position at substantially any position within the angular ranges. Therefore, the grip level of the handle member 14 is able to be best set in accordance with the height and physical build of the operator, which handle member 14 is thus capable of selective adjustment of both its turning angle and level.

Further, in use of the mower 1, cut grass is left at the rear of the travelling direction, irrespective of whether the direction of travel be forward or backward. Therefore, when mowing grass on a slope extending aside a paddy or plowed field, the cut grass, which is not laterally discharged, is kept from entering the paddy or plowed field.

Figure 12:
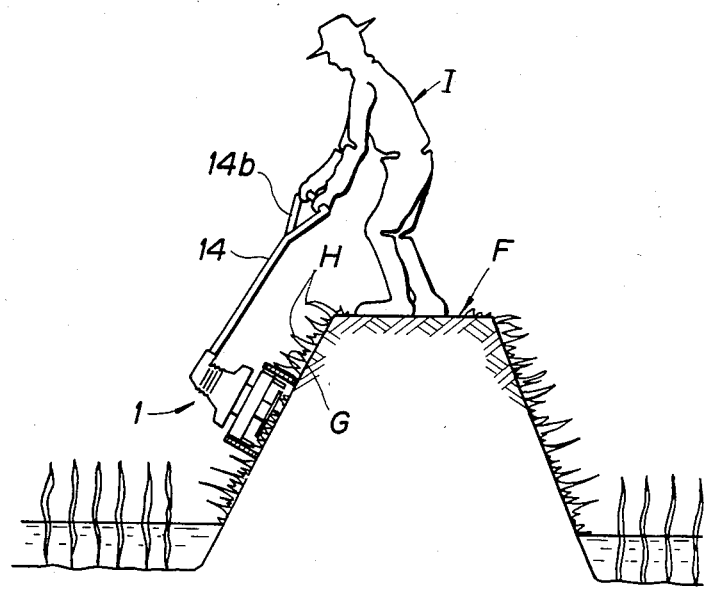
FIG. 12 is an illustration describing the use of the mower of FIG. 1.

Incidentally, as shown in FIG. 12, paddy fields or plowed fields generally have a footpath F interlaid therebetween, the footpath F sloping at either side G thereof. When using the mower 1 for cutting grass H on the sloping side G, an operator I thereof is to employ steps of: placing the mower 1 on the sloping side G at such a position that, when let to advance or retreat, it travels in parallel with the footpath F; setting the handle member 14 at a lateral position thereof, so that it faces the footpath F and extends toward the operator I, thus giving an easy access to the operator I who is thereby permitted to grasp the handle portion 14b while relaxedly standing on the footpath F; adjusting the vertical position or level of the handle member 14 at a best angle easy for the operator I to operate; and walking along the footpath F, while letting the mower 1 travel in parallel with the footpath F, cutting the grass H on the sloping side G. As a result, the mowing at such places is greatly facilitated.

Preferably, the mowing work may follow the steps of placing the mower 1 at a lowest level of the sloping side G, letting the mower 1 to travel to cut the grass H along a lowest region of the sloping side G, pulling up the mower 1 by a distance equivalent to the mowing width along the sloping side G, letting the mower 1 retreat while cutting the grass H along currently facing high mowing line, and repeating those steps to complete the mowing of the sloping side G.

Although the foregoing steps are described for mowing the descending slope of a footpath, similar operations may preferably be applied to the mowing of ascending slopes such as for example of a bank.

Further, when cutting grass growing on the bottom of a recessed ground form such as of a conduit or a channel, the operator employs the steps of placing the mower 1 on the bottom while standing outside of the recessed ground form, and setting the pivotal position and level of the handle member 14, such that the operator is permitted to cut grass on the bottom with a relaxed stance, while cutting neatly from corner to corner, leaving no grass, without going down to stand on the bottom.

Although the mower 1 according to this embodiment is provided with two front ground wheels and two rear ground wheels, it will be easily understood that the present invention is applicable also to three-wheeled mowers, which may have one front wheel and two rear wheels or two front wheels and one rear wheel.

As will be understood from the foregoing description, according to the present invention, there is provided a power grass mower which permits, as a self-propelled travelling type power grass mower and not as a shoulder-carry type, mowing to be performed smoothly, surely, and easily, with relaxed posture and simple operations, of such grass as found growing on the slope of a footpath between paddy or plowed field, on a ground in the vicinity of a fence, on slopes such as of a bank, or at the bottom of a recessed ground form such as of a conduit or channel, where the conventional mobile type power grass mower is almost unable to be employed. Moreover, under such conditions, it is effectively permitted to perform mowing work, as circumstances require, by selectively setting a proper position of a handle member, with a simple operation of anguarly adjusting the turning position as well as grip-level of the handle member.

Further, in the mower according to the present invention, a cutter housing is opened at the front side and the rear side thereof, that is, in the longitudinal direction of a mower body, so that coarse grass is exactly cut at the stem part, and the cut grass is left at the rear of the travelling direction. Since grass may be left as it withers, the mower is advantageous in the mowing of coarse grass such as in an agricultutral field.

In other words, in the mower according to the present invention, there is found no lateral or one-sided discharge of cut grass.

Because of the longitudinally discharge feature, the mower according to the present invention is directly applicable to cutting grass on the slope of a footpath between paddy fields or plowed fields because in such mowing no cut grass is thrown into the paddy or plowed fields, which is advantageous for the growing of products.

Moreover, the even cut level made possible using the present mower facilitates confirmation of the necessity of subsequent mowing work after growth of weeds.

Further, the mower according to the invention, which is of a self-propelled travelling type, minimizes weighty burden on the operator, thus resulting in the remarkable effect that the conventional tiresome labor attendant coarse grass mowing work in agricultural fields, particularly on slopes, can be eliminated.

Furthermore, the mower according to the present invention, which is adapted to travel frontwardly and rearwardly, permits repetition of advance and retreat motion while cutting grass, thereby achieving efficient mowing work.

Still more, in the mower according to the present invention, a cutter housing itself is of a simple structure opened at the front and rear sides thereof, and besides no grass bag is provided or required therefor, thus contributing to the simplification of the entire mower as well as to the inexpensive cost thereof.

Incidentally, in the embodiment described, the mower 1 is provided with front wheels 3, 3 adapted for stable travelling. In this respect, it will be understood that, without such front wheel, the mower 1 may well exhibit necessary functions thereof.

Figure 13:
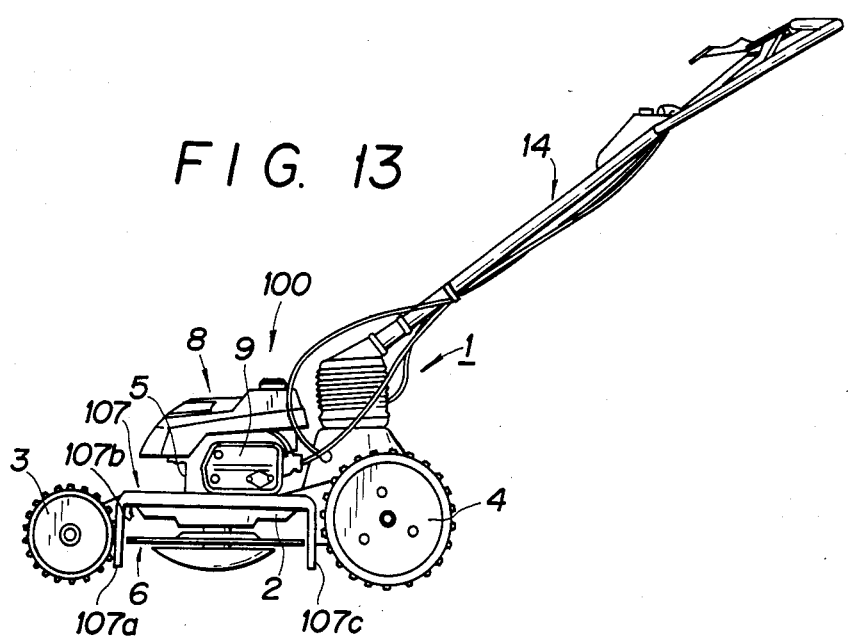
FIG. 13 is a lest side view of a power grass mower according to a first modified example of the embodiment of the invention.

Referring now to FIGS. 13 and 14, designated at reference numeral 100 is a power grass mower according to a first modified example of the preferred embodiment of the present invention.

The power grass mower 100 has a constitution analogous to that of the described embodiment, excepting a cutter housing 107. Accordingly, like parts are designated by like reference numerals, eliminating redundant description thereof.

In the mower 100, the cutter housing 107 has left and right side openings 107b, while it is covered at the front side thereof with a front plate 107a and at the rear side thereof with a rear plate 107c, the front and rear plates 107a, 107c having such a predetermined level relative to the ground, that grass in the advance direction of the mower 100 is prevented from being completely forced down, while necessarily interfering at the stem part thereof with a grass cutter 6. As a result, grass as cut by the cutter 6 is laterally discharged from the openings 107b.

Figure 15:
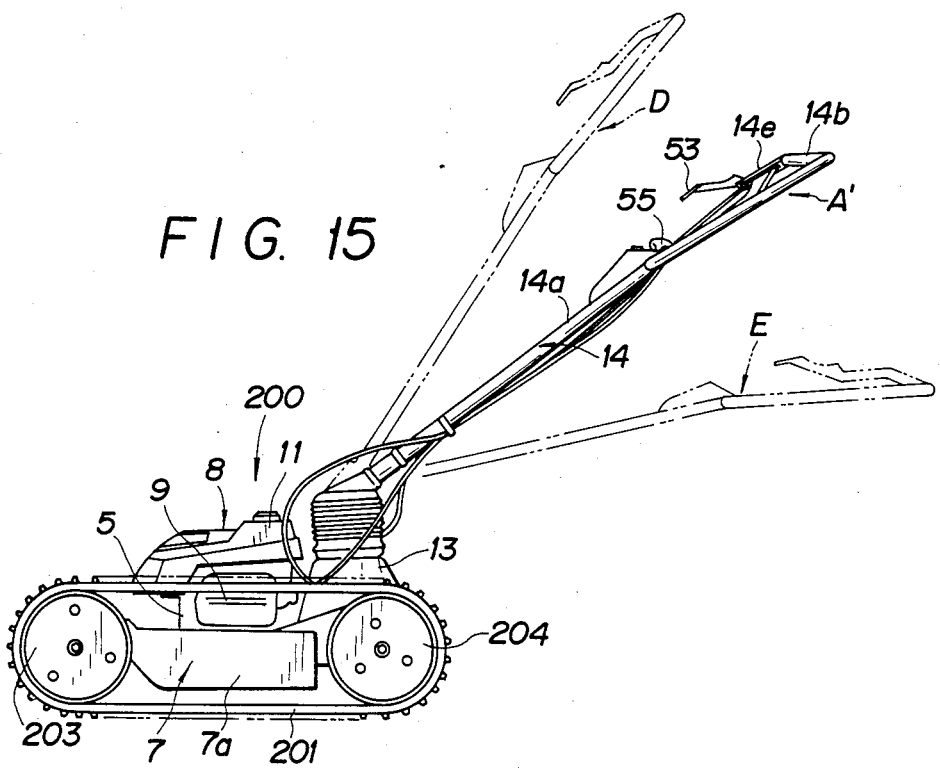
FIG. 15 is a left side view of a power grass mower according to a second modified example of the embodiment of the invention.

Referring now to FIGS. 15 and 16, designated at reference numeral 200 is a power grass mower according to a second modified example of the preferred embodiment of the present invention.

The power grass mower 200 has a constitution analogous to that of the described embodiment, excepting a pair of front wheels 203, 203, a pair of driving rear wheels 204, 204, and a pair of crawler belts 201 stretched therebetween. Accordingly, like parts are designated by like reference numerals, eliminating redundant description thereof.

In the mower 200, at each of the left and right sides thereof, the front wheels 203 as a rolling wheel and the rear wheel 204 as a driving wheel have stretched therebetween the crawler belt 201 wound thereon, thereby increasing the ground holding forces thereof.

In use of the mower 200, which is not provided with a grass bag, cut grass is directly put down on a travelling trace between the crawlers 201, to be left there, as it withers with time.

Due to the employment of crawler mechanism 201, 203, 204, the mower 200 has large ground holding forces against the ground on which it travels, even on wastelands overgrown with weeds or roads having many undulations, and thus can straightly move, while mowing, surely holding the ground, without slipping sideways, even on such roads as having undulations and sloping like slides such as of a bank or of a footpath between paddy fields or plowed fields.

Moreover, even on a soft road in a water containing muddy land, the mower 200 which has the crawler belts 201 as an endless belt of high run-through capability is self-propelled to travel, while mowing weeds growing on such road, so that it can perform the mowing work even under those conditions which otherwise might disenable the mowing work.

Further, when used for a mowing work under such conditions as shown in FIG. 12, the mower 200 is permitted to surely perform the work by the aid of the high run-through capability and straight-travelling nature of the crawler belts 201.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

We claim:

1. A power grass mower (1; 100; 200) comprising:
a mower body (2);
a grass cutter (6) disposed under said mower body (2);
a cutter housing (7; 107) attached to said mower body (2) and covering said grass cutter (6);
travelling means (3, 4; 203, 204, 201) provided for said mower body (2) and adapted to have said mower (1; 100; 200) travel;
a power source (5) mounted on said mower body (2) and operatively interconnected with said grass cutter (6) and said travelling means (3, 4; 203, 204, 201) to drive both (6, 3, 4; 6, 203, 204, 201) thereof;
a handle member (14) constituted at an upper end part (14b) thereof as a grip for an operator to handle and connected at a lower end part (14c) thereof to said mower body (2); and
a handle position setting means (39) for interconnecting said lower end part (14c) of said handle member (14) with said mower body (2), such that said handle member (14) is selectively, turningly movable through relatively large angular ranges in both the plan view thereof and the side view thereof, relative to said mower body (2), substantially about said lower end part (14c) thereof, and for locking to set said handle member (14) at substantially any voluntarily selected turning position (thereof) within said angular ranges.

2. A power grass mower according to claim 1, further comprising:
power transmitting means (16, 24, 23, 25, 30, 31, 28, 34, 37, 36, 35, 38) for transmitting power of said power source (5), selectively in a forward direction and in a reverse direction, to said travelling means (3, 4; 203, 204, 201), to thereby drive said power grass mower (1; 100; 200) into frontward travelling thereof and rearward travelling thereof.

3. A power grass mower according to claim 2, wherein:
said travelling means (3, 4) comprises left and right driving wheels (4) attached to said mower body (2), and said driving wheels (4) operatively interconnected through said power transmitting means (16, 24, 23, 25, 30, 31, 28, 34, 37, 36, 35, 38) with said power source (5).

4. A power grass mower according to claim 3, wherein:
said left and right driving wheels (4) of said travelling means (3, 4) are a left and a right rear wheel;
said travelling means (3, 4) further comprises a left and a right front wheel (3) rotatably attached to a front part of said mower body (2); and
said cutter housing (7; 107) is substantially completely opened at opposite sides thereof in either of the longitudinal and transverse directions of said power grass mower.

5. A power grass mower according to claim 4, wherein:
said cutter housing (7) is opened at the front side thereof and at the rear side thereof.

6. A power grass mower according to claim 4, wherein:
said cutter housing (107) is opened at left and right transverse sides thereof.

7. A power grass mower according to claim 2, wherein:
said travelling means (203, 204, 201) comprises a left and a right crawler belt mechanism (203, 204, 201) attached to said mower body (2), and said crawler belt mechanisms (203, 204, 201) being operatively interconnected through said power transmitting means (16, 24, 23, 25, 30, 31, 28, 34, 37, 36, 35, 38) with said power source (5).

8. A power grass mower according to claim 7, wherein:
said cutter housing (7) is substantially completely opened at the front side thereof and at the rear side thereof.

9. A power grass mower according to claim 1, wherein:
said power source (5) comprises an engine (5) disposed in a central part of said mower body (2); and
said lower end part (14c) of said handle member (14) is connected, in a handle post (13) disposed in a rear part of said mower body (2), to said handle position setting means (39).

* * * * *

UNITED STATES PATENT AND TRADEMARK OFFICE
CERTIFICATE OF CORRECTION

PATENT NO. : 4,738,084

DATED : April 19, 1988

INVENTOR(S) : Takeo OGANO et al

It is certified that error appears in the above-identified patent and that said Letters Patent is hereby corrected as shown below:

Column 2, line 20, change "cut" (first occurrence) to --duct--;
    line 58, correct the spelling of --discharged--;
    line 61, change "moving" to --mowing--.
Column 3, line 55, after "voluntarily" insert --selected--;
    line 62, change "be" to --being--.
Column 4, line 23, change "lest" to --left--;
    line 58, correct the spelling of --clearly--.
Column 5, line 47, after "axis" insert --of--.
Column 8, line 35, before "support" delete "the".
Column 10, line 35, change "if" to --is--.
Column 12, line 7, after "operator" insert --may--;
    line 33, change "as" to --an--;
    line 53, after "of" (second occurrence) insert --the--.
Column 13, line 41, correct the spelling of --preferably--;
    line 66, change "field" to --fields--.
Column 14, line 20, change "longitudinally" to --longitudinal--.

UNITED STATES PATENT AND TRADEMARK OFFICE
CERTIFICATE OF CORRECTION

PATENT NO.   : 4,738,084
DATED        : April 19, 1988
INVENTOR(S)  : Takeo OGANO et al It is certified that error appears in the above-identified patent and that said Letters Patent is hereby corrected as shown below:

Column 15, line 30, change "slides" to --sides--.

Signed and Sealed this

Twentieth Day of September, 1988

*Attest:*

DONALD J. QUIGG

*Attesting Officer*  *Commissioner of Patents and Trademarks*